United States Patent [19]

Fell

[11] Patent Number: 5,312,511
[45] Date of Patent: May 17, 1994

[54] APPARATUS FOR THE PREPARATION OF THERMOPLASTIC HONEYCOMB

[76] Inventor: Barry M. Fell, 7124 Red Top Rd., Hummelstown, Pa. 17036

[21] Appl. No.: 873,255

[22] Filed: Apr. 24, 1992

Related U.S. Application Data

[62] Division of Ser. No. 531,184, May 31, 1990, Pat. No. 5,139,596.

[51] Int. Cl.⁵ ................................. B31F 1/22
[52] U.S. Cl. ................................. 156/469; 156/205; 156/292; 156/322; 156/470; 156/471
[58] Field of Search ............ 156/205, 210, 197, 469, 156/470, 471, 292, 322; 428/116, 118; 264/DIG. 65, 286, 322

[56] References Cited

U.S. PATENT DOCUMENTS

| Re. 29,272 | 6/1977 | Hintz et al. ............ 156/210 |
| 2,821,616 | 1/1958 | Spott . |
| 2,919,472 | 1/1960 | Steele . |
| 3,051,824 | 8/1962 | Wilson . |
| 3,079,487 | 2/1963 | Rohr . |
| 3,134,705 | 5/1964 | Moeller . |
| 3,163,742 | 12/1964 | Rohr . |
| 3,283,118 | 11/1966 | Runkle . |
| 3,356,555 | 12/1967 | Jackson . |
| 4,153,663 | 5/1979 | Vetter et al. ............ 264/286 |
| 4,461,665 | 7/1984 | Schertler ............ 156/322 |
| 4,957,577 | 9/1990 | Huebner . |

FOREIGN PATENT DOCUMENTS

| 0336721 | 10/1988 | European Pat. Off. . |
| WO8706186 | 10/1987 | PCT Int'l Appl. . |
| 312801 | 6/1929 | United Kingdom . |

*Primary Examiner*—Michael W. Ball
*Assistant Examiner*—Michele K. Yoder

[57] ABSTRACT

Fiber-reinforced thermoplastic honeycomb is prepared in a continuous manner one half cell at a time by laying down a corrugated web of thermoplastic, with and without fiber-reinforcement atop a honeycomb, selectively fusing the node-antinode demes and repeating the process until a honeycomb of the desired depth is prepared.

7 Claims, 8 Drawing Sheets

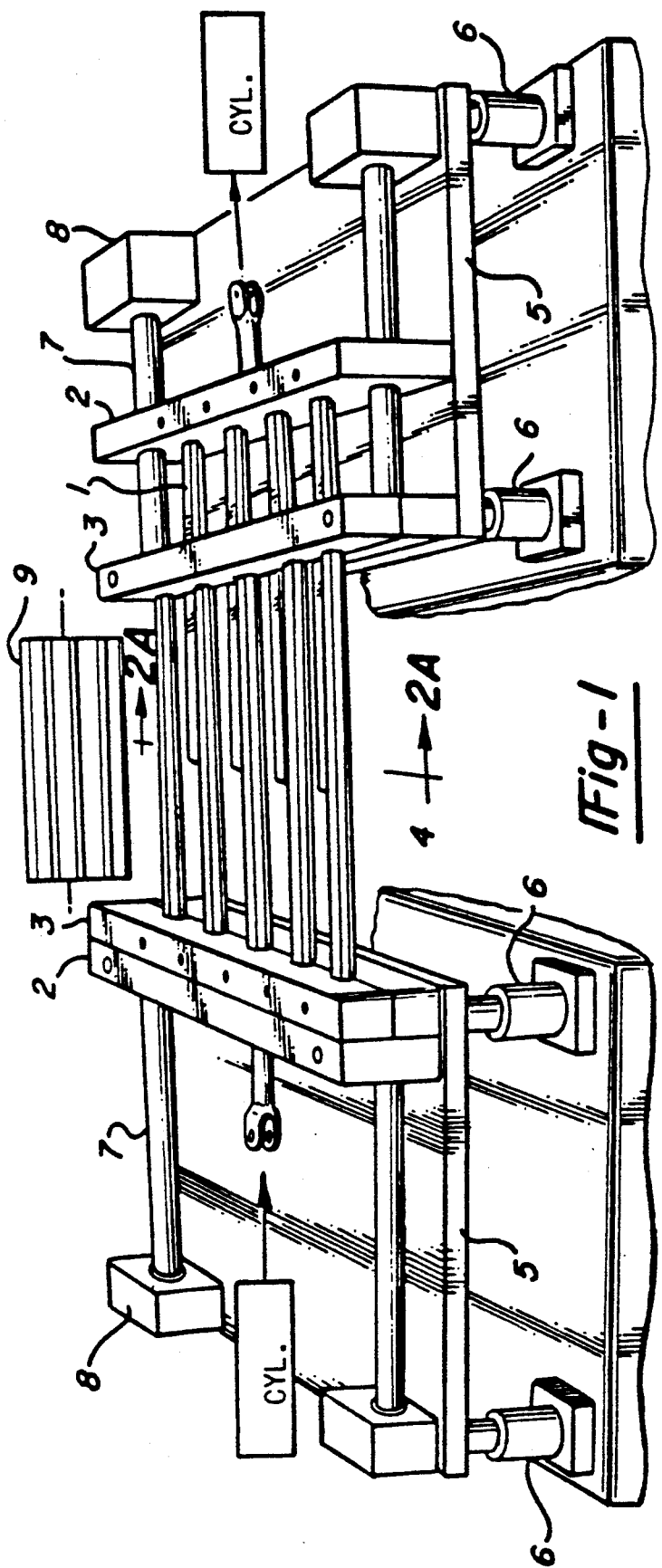

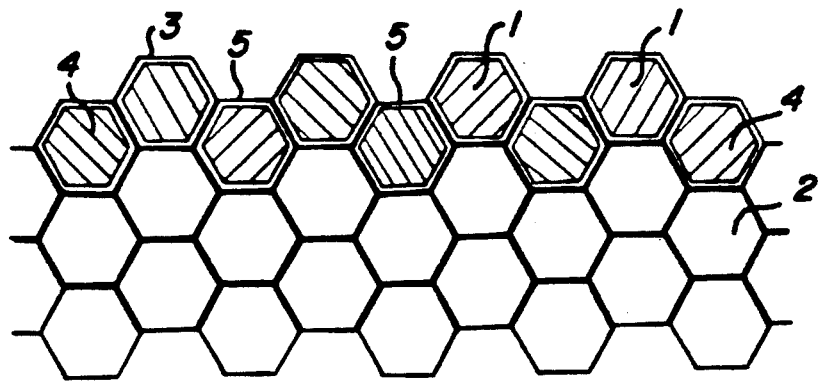
_Fig-2B_
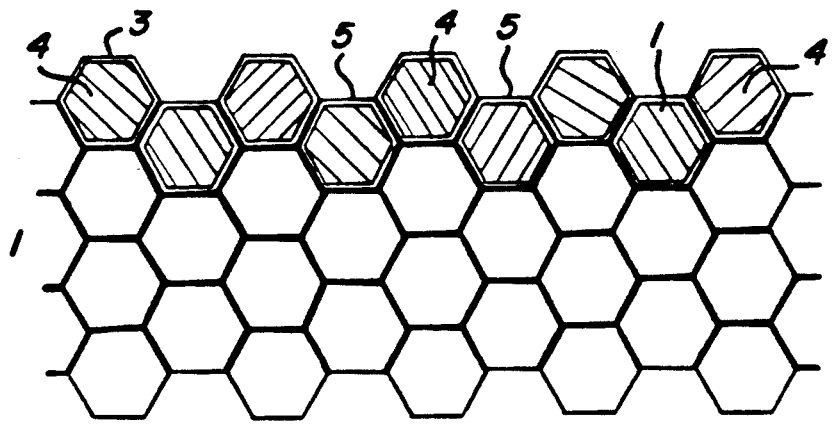
_Fig-2C_
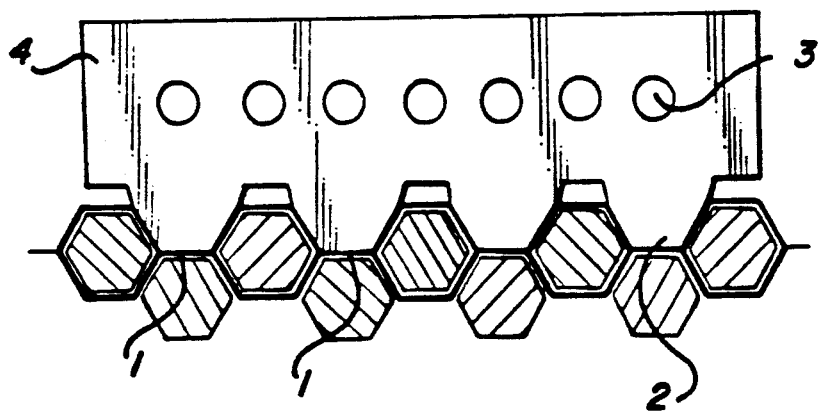
_Fig-3_

APPARATUS FOR THE PREPARATION OF THERMOPLASTIC HONEYCOMB

This is a division of U.S. application Ser. No. 07/531,184 filed May 31, 1990, now U.S. Pat. No. 5,139,596.

BACKGROUND OF THE INVENTION

1. Field of the Invention

The subject invention pertains to the preparation of fiber reinforced and non-fiber reinforced thermoplastic honeycomb. More particularly, the subject invention pertains to processes by means of which such honeycomb may be produced in an economical, continuous manner.

2. Description of the Related Art

Paper honeycomb was first made by the Chinese approximately two thousand years ago, but at that time it was used primarily as ornamentation and not as a structural material. The modern utilization of honeycomb structures began just after 1940, and today there are about ten companies manufacturing the various core types.

While the primary utilization of honeycomb structure is in the construction of sandwich panels, it has many other applications, such as energy absorption, air directionalization, light diffusion, and radio frequency shielding.

U.S. Pat. No. 4,500,583, to Naul, discloses a honeycomb structure made of resin impregnated molded glass wool. In particular, glass wool blankets containing about 20 to 25 percent by weight of an uncured binder such as urea-phenol-formaldehyde resin are molded into corrugated sheets under heat and pressure in a two-part mold. A plurality of the corrugated sheets can then be adhesively bonded to one another to form a honeycomb structure.

U.S. Pat. No. 2,734,843, to Steele, discloses a method of producing honeycomb wherein longitudinally extending, spaced, parallel lines of adhesive are applied to the face surface of continuously moving web material, the web material is cut into separate flat sheets of uniform size, and said sheets are adhered to one another with the obverse side of each sheet adhered to an adjacent sheet by a plurality of spaced parallel lines of adhesive and the reverse side of each sheet adhered to an adjacent sheet by a plurality of spaced parallel lines of adhesive, which are in staggered parallel relationship to the lines of adhesive on the obverse side.

U.S. Pat. No. 3,032,458, to Daponte et al., discloses a method of making an expandable structural honeycomb material which comprises securing together a number of layers of flexible sheet material in a stock by means of an adhesive distributed between the layers in patches arranged in arrays of intersecting rows and columns and positioned such that the columns at the obverse face of each intermediate layer are staggered with respect to the columns at the reverse face of said layer while the rows at said faces are coincident, and slicing the stack by cutting it in the direction of the rows at position such that the contacting pairs of faces of the sheet material within the slices thus producing are secured together over a part only of their width by at least a part of a single row of patches.

U.S. Pat. No. 3,028,481 to Covert discloses a method of forming metal honeycomb materials whereby a strip of uncorrugated metal is corrugated as part of an integrated honeycomb welding operation. The honeycomb is welded by means of crescent shaped electrodes having a circumference substantially equal to or greater than the honeycomb thickness.

U.S. Pat. No. 3,225,433 discloses one method of aligning corrugated metal webs in a node-antinode relationship to eliminate problems associated with stretching and/or distortion of preformed corrugated webs.

U.S. Pat. No. 4,128,678, to Metcalfe et al., discloses a method and apparatus for the manufacture of a heat insulating material from an unsecured, strip-shaped felt of fibers containing a heat hardenable bonding substance. The felt is first formed into a serpentine array of corrugations extending across the entire width of the uncured felt and then cured. The felt is then cured and the cured felt is cut longitudinally into two partial felts, the corrugations being severed so as to form a succession of U-shaped arrays along each of the partial felts.

U.S. Statutory Invention Registration H47, to Monib, discloses a lightweight structural panel of an aramid honeycomb core faced with a resin-impregnated fiber layer, wherein peel strength between the core surface and the facing layer is improved by interpositioning of a spunlaced fabric, containing at least 50% aramid fibers pervaded with a curable resin, between the core surface and the facing layer.

U.S. Pat. No. 4,012,738, to Wright, discloses a microwave radiation absorber comprising a layer of dielectric material of relatively high dielectric constant and a layer of magnetic material having a relatively high coefficient of magnetic permeability.

U.S. Pat. No. 3,600,249, to Jackson et al., discloses a method and apparatus for the production of a reinforced plastic honeycomb comprising the steps of: (1) impregnating a fabric which distorts under its own weight, such as a fiber glass fabric, with a heat curable resin in an amount sufficient to cause the fiber glass fabric to have sufficient body to prevent its distorting under its own weight while permitting expansion after curing; (2) applying adhesive lines on the impregnated fiber glass fabric, the adhesive being applied so as to avoid penetration to the opposite side of the fiber glass fabric, and allowing said adhesive lines to advance to a relatively non-tacky state; (3) stacking sheets of the so-produced fiber glass fabric with the lines of adhesive on one sheet in staggered relation to the lines of adhesive on adjacent sheets; (4) applying heat and pressure to the so-formed stack to cause the adhesive to flow and bond to the surface of the next adjacent sheet in the stack; (5) expanding the stack to form a honeycomb configuration; (6) applying heat and pressure to the expanded stack created in step (5) to fully cure the impregnated resin and the adhesive; (7) dipping the rigid honeycomb structure formed in step (6) into a mass of uncured resin; and (8) following the dipping, curing the resin so-coated onto the rigid honeycomb structure.

U.S. Pat. No. 3,321,355, to Holland, discloses a method of making a honeycomb structure from fabric reinforced plastic wherein the warp and woof of the fabric in the final honeycomb product are obliquely disposed to the longitudinal axis of the honeycomb cells. In particular, the method comprises: providing a plurality of non-rectangular parallelogram shaped cut sections of fabric reinforced plastic material of substantially the same pattern and size in which the warp of the fabric extends parallel and the woof of the fabric extends perpendicular to a first pair of parallel sides ofeach section and at acute angles in reference to a second pair of parallel sides of each section; superimposing such sections one upon the other in a stack; adhering such sections to one another along spaced apart parallel bonding lines extending perpendicular to said second pair of parallel sides, the bonding lines of successive superimposed sections staggered relative to one another to form a honeycomb structure.

U.S. Pat. No. 3,598,676, to Noble, is an improvement over the aforementioned Holland patent, to reduce waste material, i.e., to eliminate the step of trimming portions of the parallelogram shaped core to produce a rectangular shaped core. In particular, the improved method comprises: forming a plurality of non-rectangular parallelogram shaped sections of fabric reinforced plastic material in which a first and second side of the section are substantially parallel to each other and to the warp or woof of the fabric and in which a third and fourth side of the section are substantially parallel to each other and disposed at an oblique angle to the warp and woof of said fabric, the distance between the third and fourth sides of each section being substantially equal; joining the first and second sides of said sections together in serial relationship to form a web having a width equal to the distance between the third and fourth sides of one of said sections and a length approximately equal to the sum of the first sides of all sections which are joined together in serial relationship, the third and fourth sides of said joined sections forming the lateral edges of the web; cutting a plurality of equal rectangular shaped sections from said web, two sides of each rectangular section being cut perpendicular to the lateral edges of the web; superimposing a plurality of said rectangular sections one upon another in a stack; and adhering said plurality of rectangular sections to one another along spaced apart bonding lines which are substantially parallel to each other and perpendicular to two sides of said superimposed rectangular sections, the bonding lines of adjacent superimposed sections being staggered relative to one another to form a plurality of adjacent cells having longitudinal axes which are substantially parallel to each other and perpendicular to two sides of said superimposed rectangular sections, whereby a bias weave honeycomb core structure is formed in which the warp and the woof of said fabric are disposed at an oblique angle to the longitudinal axes of said cells.

U.S. Pat. No. 3,759,775, to Shepherd, discloses a method for producing an absorbent, high bulk, very low fiber density stabilized web. In particular, an air laid web of fibers is thoroughly impregnated with a volatile liquid. The volatile liquid may contain a small amount of heat-activatable binder, or the web of fibers may include the binder in the form of a small amount of thermoplastic fibers or powder dispersed throughout the web. The so-impregnated web is then heated, preferably, by dielectric heating or the like, so as to vaporize the liquid whereby the web is explosively puffed up and the small amount of binder secures interconnections of the fibers to maintain the web super-structure.

U.S. Pat. No. 3,134,705 discloses the preparation of flanged, non-reinforced honeycomb materials by fusing together corrugated thermoplastic webs by means of a pair of heat sealing jaws one node-antinode at a time. The resulting honeycomb is collapsed for shipment, reexpanded, and flanged by placing between heated platens.

U.S. Pat. No. 3,366,525, to Jackson, discloses a method of making honeycomb or similar laminated structures from sheets of heat sealable plastic which are cocured together under heat and pressure at selected areas. In an example a polyethylene web 10 inches wide and 4 mils thick is cut into sheets of material 18 inches long. A release film is printed on the sheets in lines 0.441 inch wide which are spaced apart by exposed or release-film-free regions 0.135 inch wide. The sheets are stacked in a mold and then subjected to heat and pressure to seal adjacent sheets together in those regions free of release film. The mold is cooled, the pressure reduced, and the stack of heat sealed sheets removed from the mold. The stack is then heated and pulled to expanded condition and the so-formed honeycomb is then cooled.

As may be readily ascertained from the above-noted documents, the preparation of honeycomb structure from fiber-reinforced plastics requires numerous web handling steps including multiple impregnation and/or dipping steps. In the case of obtaining higher shear modulus and improved handleability, the cutting of woven webs on the bias and their re-orientation requires even more handling steps.

U.S. Pat. No. 3,356,555 to Jackson discloses a batch method of preparing honeycomb core wherein a squirrel cage roller containing hexagonal bars operates in conjunction with a plurality of hexagonal major bars on a fixed bed to provide a corrugated web by the action of compressing a heated thermoplastic web between the advancing squirrel cage bars and the fixed bed bars. The corrugated webs thus produced are then assembled into a honeycomb structure by placing a first corrugated web on the major bars of a bed followed by placing minor bars in the nodes above the web. A second corrugated sheet is then located with its nodes adjacent to the first web's antinodes. An additional layer of minor bars is placed on top and the procedure repeated until the desired honeycomb thickness is achieved. The assembly is then placed between caul plates and platens and heated to form a finished honeycomb product.

In GB-A-2 188 866, a batchwise method of preparing thermoplastic honeycomb is disclosed wherein shaped formers as disclosed by Jackson in U.S. Pat. No. 3,356,555 are disposed between adjacent corrugated thermoplastic sheets, the assembly pressurized, and heated to cause the thermoplastic to fuse. Following the preparation of one multiple cell honeycomb segment by such batchwise operation, the section may be advanced to allow a further section to be laid up and fused. The process described requires pressurizing and heating the entire newly formed honeycomb structure.

OBJECTS OF THE INVENTION

The related art processes produce honeycomb cores in batchwise fashion requiring lengthy heating and cooling cycles to process the honeycomb, or by expansion methods which are directed to but limited honeycomb sizes and to honeycombs not having optimal properties. The processes of Jackson '555 and Great Britain '866 require the use of numerous layers of expensive metal formers. For example, a four foot length of 0.125 cell width honeycomb having but a height of four cells would require in excess of 1400 metal formers. Furthermore, such batchwise processes are time consuming, and require pressurizing an entire honeycomb structure to enable thermoplastic fusion and adherence.

Furthermore, because the abutting node and antinode surfaces of web material is double the thickness of the non-abutting surface, this thickness disparity creates a displacement error in assembling honeycombs using metal formers. Because the error is magnified by each successive cell layer, it is virtually impossible to keep such cores aligned during layup and during cure under pressure. If the formers are made unsymmetrical, i.e. a flattened hexagon, then layup is facilitated, but distortion still occurs during consolidation as the double thickness abutting layers are compressed during fusion to approximately 80 percent of their initial thickness.

It is an object of the present invention to prepare honeycomb in a continuous manner in which one half a layer of honeycomb material, i.e., one half cell height, is added in continuous fashion to the previously prepared honeycomb. It is further an object of the subject invention to avoid time consuming batchwise operations, the use of multitudinous metal formers, and the use of cauls and pressurized platens in batchwise preparation of a multicell-height honeycomb product.

In the parlance of one skilled in the art of honeycomb production and useage, the thickness of the honeycomb is considered as the dimension parallel to the corrugations, the length is the direction along the same surface as the corrugations but at a right angle thereto, and the width is the direction across the cells perpendicular to the plane of the corrugations (thickness and length directions).

BRIEF DESCRIPTION OF THE DRAWINGS

FIG. 1—A drawing of the honeycomb forming bed with primary formers inserted and secondary formers partially inserted.

FIGS. 2A-2C—Side views of the bed showing the ends of the primary and secondary formers with topmost and penultimate layers of fiber reinforced corrugated layers in node to antinode contact and production of honeycomb one half cell layer at a time.

FIG. 3—A side view of a bed showing a hot shoe used to achieve selective heating.

DESCRIPTION OF THE PREFERRED EMBODIMENTS

Figure 4:
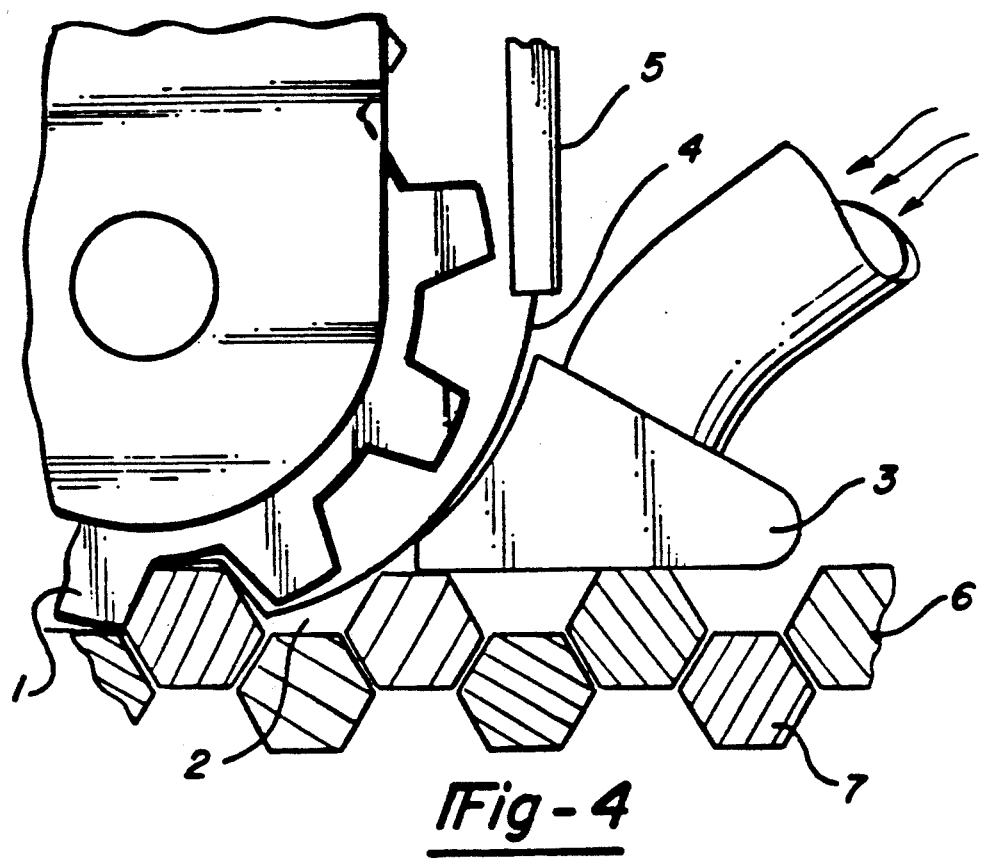
FIG. 4—A side view showing the use of a toothed wheel for achieving pressurized fusion of node to antinode contact areas with integrated corrugation of fiber web by hot air impingement.

The foregoing objects were unexpectedly met by the discovery of a continuous process whereby (a) a first set of metal formers of suitable shape are disposed such that one former is located within each cell of the topmost layer of a honeycomb structure of at least one cell thickness, (b) a second set of metal formers displaced laterally from the first set by half the cell spatial frequency are disposed in the antinode depressions located at the top surface of the honeycomb, (c) a corrugated web of thermoplastic is laid atop of the topmost set of metal formers such that the bottom surface of the antinodes of the corrugated web abut the top surface of the nodes of the honeycomb, (d) the node-antinode surfaces, or demes, are fused by selective heating means of these surfaces, (e) the lowermost set of formers is withdrawn from the core, raised by an amount sufficient to clear the thickness of the fused node-to-antinode surface of the newly formed honeycomb cells, and disposed in the nodal depressions along the top surface of the honeycomb, becoming by virtue of this displacement the topmost set of formers; (f) a further corrugated web of thermoplastic is laid atop the topmost metal formers such that the bottom surface of the antinodes of the corrugated web abut the top surface of the nodes of the honeycomb, (g) the abuting node-antinode surfaces are fused by selective heating of these surfaces, and (h) steps (e)-(g) are repeated until the desired honeycomb width, which may be essentially infinite, is obtained.

By means of the subject invention, honeycombs of virtually any dimensions may be obtained in a continuous, cost-effective manner, without the drawbacks associated with batchwise operations, e.g., the use of multitudinous bars or formers and the time-consuming batch fusing step which must be accomplished by pressurizing the entire honeycomb core assembly or portion thereof.

The thermoplastic matrix sheets useful in preparing corrugated sheets and ultimately the final honeycomb product contain a thermoplastic, preferably an engineering thermoplastic, and fibrous reinforcement.

Among the thermoplastics useful are the various polyesters, for example polyethylene terephthalate and polybutylene terephthalate; the aliphatic polyamides, for example nylon 6, nylon 66, nylon 4, nylon 12, and nylon 612 among others; the all aromatic polyamides or aramids, for example those produced under the tradename Kevlar ®; mixed aliphatic/aromatic polyamides; polyalkylene polymers, for example polypropylene and polyethylene; the polyoxyalkylenes, for example polyoxymethylene polymers; the polyphenylene oxides; the polyphenylene sulfides; the various polyarylene polymers having interspersed between the arylene groups connecting groups such as —O—;

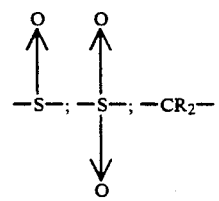

where R is a $C_1$-$C_{10}$ alkyl or aryl group or hydrogen;

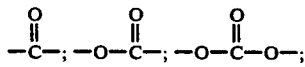

and the like, particularly polysulfones, polyethersulfones, poletherketones, polyetheretherketones, polyetherketoneketones and other variants; and thermoplastic polyimides, including those polyimides which are thermoplastic initially but cure to form crosslinked structures at higher temperatures.

This foregoing list of thermoplastics is meant to be illustrative, and not limiting. Also useful, in this respect, are mixtures of thermoplastics, as well as mixtures of thermoplastics with a minor quantity, i.e., not more then about 20–30 weight percent of one or more thermosetting monomers, for example bismaleimides, epoxy resins, and cyanate ester resins. In the case where mixtures of thermoplastics and thermosetting resins are used, it may be necessary to effect a final heat treatment of the honeycomb, which may be continuous as by means of passing the honeycomb through a heated zone on a conveyor belt. The temperature required to cure the thermosetting resin is generally considerably less than the fusion temperature of the thermoplastic, and thus no distortion of the honeycomb would be expected.

The reinforcing fibers useful in preparing the subject invention honeycomb may be selected from any fibers which retain sufficient mechanical properties at the processing temperatures required for fusion of the thermoplastic. Thus when low melting point thermoplastics such as polypropylene or polyethylene terephthalate are utilized, fibers of high temperature thermoplastics, i.e., aramid, polysulfone, or polyetherketone may be utilized. However, preferred reinforcing fibers are those of glass, quartz, carbon, silicon carbide, and the like.

The reinforcing fibers may be utilized in many different forms. For example, random mats of staple fibers which optionally may be needled in a needle or felting loom, may be utilized, as may mats of swirled continuous fibers. However, it is preferable to utilize reinforcing fibers in the form of unidirectional tapes or as woven fabric. Moreover, it is possible, within the same thermoplastic impregnated corrugated sheet, to utilize two or more layers of different fiber forms. For example a unidirectional tape may be sandwiched between two woven fabrics to provide greater strength in the tape fiber direction; or two woven fabrics may be oriented at a 45° angle to each other to provide a nearly isotropic assembly. By these expedients, the tensile and compressive strength may be tailored for the particular application. In a like manner, the impact resistance and electromagnetic properties may be altered by employing layers of dissimilar fiber materials, for example layers of fiberglass and carbon fibers and/or powder.

The fiber reinforced thermoplastic sheets used to prepare the honeycomb materials of the subject invention are prepared by impregnating one or more layers of fiber reinforcement with the thermoplastic, mixture of thermoplastics, or mixtures of thermoplastic(s) and thermosetting resins. Suitable methods of impregnation are well known to those skilled in the art. For example, melt impregnation is particularly useful for thermoplastics with low fusion or glass transition temperatures, although the technique has been used with high melting thermoplastics as well. Melt impregnation is particularly successful with thermoplastics with low melt viscosities and is virtually mandatory with thermoplastics which have limited solubility. Solution impregnation, where the thermoplastic is soluble, is also utilized. In either case, the thermoplastic/fiber contents can be varied over a wide range. Preferably, the fiber content lies between 20 and 80 weight percent, more preferably between 30 and 70 weight percent, and most preferably between 60 and 70 weight percent. However, because of the selective heating aspects of the subject invention, sheets having exceptionally low, 100% thermoplastic fiber content fiber contents or even no fiber content may be used. The thickness of the fiber-reinforced thermoplastic sheet, or web, generally lies between 0.001 inch and 0.010 inch. Non-reinforced thermoplastic sheets, which can also be used in the subject process, may have the same thicknesses.

Honeycomb may also be prepared from 100% thermoplastic web material. These materials may consist of oriented or non-oriented continuous or chopped thermoplastic fibers, for example of polyethylene, polypropylene, or polyester. Examples of such webs are Typar ® and Tekton ® polypropylene spunbonded web and Reemay ® spunbonded polyester web available from Reemay Incorporated, Old Hickory, Tenn.; and Tyvek ® spunbonded olefin high density polyethylene web available from DuPont. These materials, upon consolidation, may melt completely forming a solid thermoplastic web, or only some fibers may melt only, forming a thermoplastic matrix containing thermoplastic fibers. The latter condition may also be realized when all-thermoplastic spunbonded materials containing two different thermoplastics, for example polyethylene and polypropylene, or a single family of thermoplastics having different melt temperatures are used.

Webs such as 100% spunbonded and calendered webs can be described as a 100% fibrous medium (where all the fibers are usually made from the same resin type) which when made up from extremely fine filament diameters, and calendered, becomes essentially impervious to fluid or gas flow. Therefore, in this process, they act as if they are made from a consolidated fiber/matrix composite or 100% resin film web and hence are able to be processed in a fashion similar to these one and two component webs described elsewhere in the application. They will melt along their bonding surfaces and thus can be joined together but retain their highly densified fibrous nature outside of the immediate area of bonding.

Figure 5A:
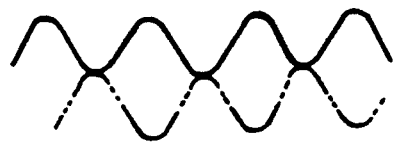
FIG. 5—Various geometric corrugation configurations which may be used to prepare honeycomb.
Figure 5B:
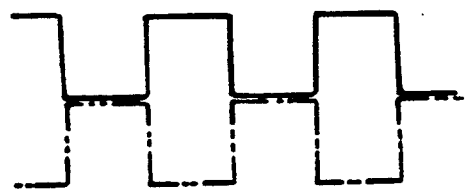
Figure 5C:
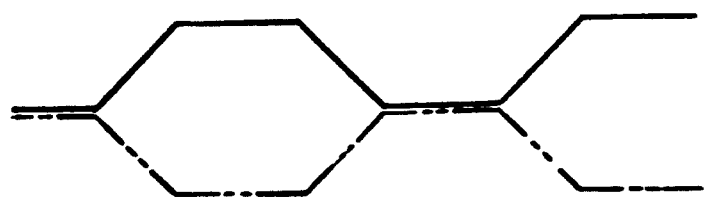

In preparing the honeycomb of the subject invention, the fiber reinforced thermoplastic sheet must be corrugated into a configuration which represents a half cell of the finished honeycomb. FIG. 5 illustrates three different half cell corrugation configurations. In 5A, the cell shape will be square or rectangular, depending upon the depth of the corrugations. In 5B, the corrugations are sinusoidal, forming a cell shape similar to base to base bells. In 5C, the half cell corrugation is trapezoidal, forming the most preferred hexagonal cell structure. In the remainder of the specification, the description of the process and of the apparatus utilized in the process will be directed to forming a honeycomb with a hexagonal cell structure. However, the modifications necessary to provide honeycomb of other cell shapes will be readily apparent to those skilled in the art.

The fiber-reinforced and non-fiber-reinforced sheets may be corrugated by conventional means, for example by compressing hot sheets between meshing toothed wheels as described in U.S. Pat. No. 3,356,555 and the copending parent application. Other methods, well known to those skilled in the art, may also be used. The corrugated sheets may be prepared in the form of a continuous ribbon whose width is equal to the thickness of the honeycomb core, or may be prepared as individual sheets whose length and width correspond to the honeycomb length and thickness, respectively. Of course, the sheet may be supplied in sizes larger than honeycomb dimensions and cut to shape, but this is wasteful of both time and material.

The corrugated sheets, in whatever form, may be corrugated long before use, or may be corrugated immediately prior to layup into honeycomb in an integrated manufacturing process. Corrugated fiber-reinforced thermoplastic sheets containing low modulus fibers such as high temperature thermoplastic or glass may be prepared in roll form and used subsequently. However, with carbon fiber and silicon carbide fibers, the modulus is so high that substantial bending is not possible, and thus these materials must be prepared ahead of time in sheet form, or alternatively, integrated into the process by corrugating just prior to or coincidently with laying up into the honeycomb structure.

With reference to FIG. 1, the lowermost formers (1) which, for a hexagonal cell honeycomb, have a hexagonal cross-section, and which are secured by securing blocks (12), are inserted through the top layer of cells of a preformed honeycomb starter onto the bed rails (13). Means of insertion may be by electric servo motor, by pneumatic or hydraulic motors or rams, or other equivalent means. Topmost formers (4) are then inserted on top of the honeycomb with the formers occupying the antinode depressions in the top of the honeycomb core. Means for moving the rods (formers) and for raising and lowering them will readily suggest themselves to one skilled in the machinery arts. Further description of suitable methods may be found, for example, in U.S. Pat. No. 3,283,118 which is herein incorporated by reference. A corrugated sheet (not shown for clarity) is laid on top of the topmost rods such that the antinodes of the second sheet are in contact with the nodes of the honeycomb topmost layer. At least the node to antinode surfaces (demes) of the first and second sheets are heated, and pressure exerted to fuse the node to antinode surface. The lowermost set of formers are then withdrawn, raised, and inserted into the antinode depressions of the newly formed top row of honeycomb cells, becoming the topmost set of formers in the process. As a result, the honeycomb has been increased in size by one half cell.

Further with reference to FIG. 1, the height of both sets of metal formers (1 and 4) may be adjusted by raising or lowering the height of the bed frame (15). Various means may be used to accomplish such raising or lowering, such as the use of hydraulic or pneumatic pistons (16). The former securing blocks may be free floating, may be hinged, but preferably are regulated in their motion through the use of linear bearings (17) attached to pillar blocks (18). Other equivalent means of raising and/or lowering the formers will readily suggest themselves to one skilled in the art.

After the topmost corrugation has been fused to the existing honeycomb, the lowermost bars (1) as previously stated, are withdrawn, raised by pistons (16) to a height such that the bars may clear the thickness of the most recently fused node-antinode surfaces, and reinserted, becoming the topmost formers in the process. Both bed frames are then lowered by one half cell height and the now topmost bars lowered slightly to establish pressure between the two sets of formers and the honeycomb material located between them. The raising and lowering sequence may be varied as long as the final result is the same or its equivalent. In FIG. 1, consolidation is by toothed roller (19) and hot air heating means (not shown).

The honeycomb forming sequence is shown by FIGS. 2A-2C, which are a section taken through FIG. 1 but with honeycomb material in place. In FIG. 2A at (1) are the lower most row of bars or formers which are located in the topmost cell layer of a honeycomb (2). The topmost row of formers (4) is inserted into the antinode depressions and clamped down trapping the honeycomb (2) between the lower (1) and topmost (4) formers. A layer of corrugated fiber reinforced thermoplastic web or corrugated unreinforced web (3) is laid atop the topmost bars (4) and consolidated at the node-antinode depression demes (5). The lowermost formers (1) are then withdrawn, raised by an amount equal to or greater than the consolidated node-antinode deme thickness and reinserted, resulting in FIG. 2B.

In FIG. 2B, the numbering of FIG. 2A has been retained. Note that the lowermost formers (1) of FIG. 2 A have become the uppermost formers (1) of FIG. 2B while the uppermost formers (4) of FIG. 2A are now the lowermost formers (4) of FIG. 2B and the honeycomb (2) has been increased in width by one half cell. Another layer of corrugated web is laid down, consolidated with heat and pressure, and the lowermost formers (4) withdrawn, elevated, and reinserted, once again becoming the topmost formers (4) in FIG. 2C (as also in FIG. 2A), but note that the honeycomb structure (2) in FIG. 2C has now been increased in width by a full cell. This process is repeated until a honeycomb of the desired width is created.

Figure 6:
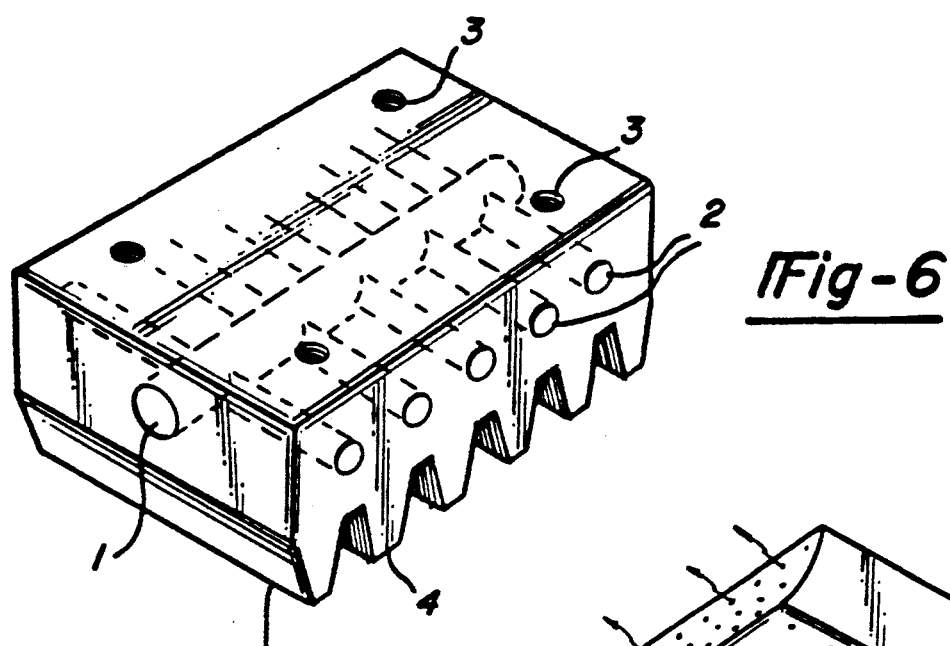
FIG. 6—Isometric view of one configuration of hot shoe or platen selective heating means.

In the practice of the subject invention according to the previous description, it is necessary to heat the node to antinode surfaces and to apply pressure to cause these surfaces to melt and diffuse into each other forming a strong bond. This process may be assisted in some cases by depositing a suitable film adhesive on the node and antinode facing surfaces; however, this approach is generally undesirable as it requires additional steps and material. Many equivalent means of heating and melt fusing the node to antinode contact surfaces may be readily envisioned, but it is preferable to fuse more than one deme at the same time. One such means, a hot shoe, is depicted in FIGS. 3 and 6. With reference to FIG. 3, the hot shoe (64) is positioned such that the projections (62) on the bottom of the hot shoe correspond to the antinode hollows (61) on the top fiber reinforced thermoplastic or nonreinforced thermoplastic corrugated sheet. The hot shoe is wiped across the honeycomb in a direction parallel with the corrugations, that is across the thickness direction. The bottom surface of the hot shoe, which may be made of metal, ceramic, graphite, or other material, has projections (62) on the bottom whose shape and spatial frequency coincide with the cell shape and width of the honeycomb. The width of the hot shoe preferably coincides with the length of the honeycomb to be produced, as such size permits fusion of an entire half cell depth of honeycomb across the length of the honeycomb in one pass of the hot shoe. However, it is also possible to utilize a hot shoe whose width is, for example, a whole fraction of the honeycomb width and to index the hot shoe such that it makes multiple passes. Alternatively, multiple hot shoes may be utilized, each of which fuses node-antinodes along a portion of the honeycomb length.

The hot shoe also contains an integral heating means sufficient to maintain the bottom surface of the hot shoe at or above the fusion temperature of the thermoplastic. This heating means may be resistance heating coils, cartridge heaters, or hot air supplied through flexible metal tubing. Cartridge heaters are depicted in FIG. 3 at (23) from the end. FIG. 6 shows the hot shoe containing an air manifold. Hot air for heating, or cool air for cooling is supplied to manifold inlet (21) and distributed to heating and cooling passages (22). Mounting holes (33) are used to mount the hot shoe or platen on the assembly (not shown) used to traverse the platen across the honeycomb under pressure to effect fusion. Preferably, the longitudinally extending projections (20) are radiused across surface (25), along the honeycomb width direction, to more efficiently transfer pressure to the node-antinode contact area and to prevent resin buildup on the shoe surface. While it has not proven necessary to apply release agents to the shoe or the thermoplastic sheet surface, such coatings may be desirable in certain cases. It may also be possible to coat the surface of the projections (20) with a slippery or non-adherent coating to assist in preventing resin buildup. This technique is particularly useful with the lower fusing thermoplastics, but may present problems with thermoplastics of high melting temperatures due to the durability of the coating and its inability to adhere to the hot shoe surface at elevated temperatures. An advantage of the hot shoe method of bonding is that the hot shoe does not have to be cooled down prior to leaving the fusing area since it is removed from this area using a sliding motion.

An alternative means for fusing the node-antinode mating surfaces of the corrugated fiber-reinforced thermoplastic sheets is to utilize a heated platen. Such a platen is also illustrated by FIG. 6. The ridges or projections (20) from the surface of the platen correspond to the shape and spatial frequency of the honeycomb cells. As is the case with the sliding hot shoe, the crossection may be square for cell shapes which have a flat node-antinode surface even though the cell shape is hexagonal as there is normally no necessity to heat the non-mating surfaces of the cell (the cell walls). The heated platen is pressed onto the exposed honeycomb surface for a time and at sufficient pressure to cause fusion at the node to antinode surfaces of the corrugated thermoplastic sheets. The pressure required is often 50 psi (0.34 MPa) or greater at the node-antinode surface which translates to 45 tons of pressure on a 12"×48" (30.5 cm×112 cm) platen surface. This large amount of pressure creates drawbacks to the use of such platens as it requires both the platen as well as the machine and machine bed to be of substantial construction. The essential difference between the hot shoe and platen is that the platen is placed onto the honeycomb to be consolidated with generally only an up and down motion, while the hot shoe is wiped across the honeycomb with a sliding motion. Also, hot shoes are generally radiused across surface (25) of FIG. 6 resulting in concave teeth which provide for less resin pickup and which can be applied to the surface to be consolidated in either a rolling motion or a sliding motion.

An additional drawback of platen fusing is that the platen must be cooled to below the thermoplastic fusion temperature before removing from the bonding surfaces as the platen is not normally removed by a sliding motion. If the temperature is too high, resin lift off may occur. Even at lower temperatures, resin transfer may be a problem, thus use of release agents may be required. Standard release agents such as Frekote ® releases may be metered or painted onto the antinode which lies atop of the node-antinode surface which is in contact with the platen projections, or may be applied to the top surface of the platen projections, for example by means of a roller or other equivalent means. Care must be taken to insure that the release coating does not contact the node surfaces of the top layer of corrugated thermoplastic sheets which will be bonded subsequently to the antinode of the yet-to-be-positioned next sheet.

Because of the pressure to be applied by the platen, the formers present in the assembly may bend downwards, especially along the central portion most remote from the bed edges. To ensure adequate and uniform pressure along the entire honeycomb width, the surface of the platen may be machined slightly convex, as indicated previously, so as to take into account the displacement of the rods.

Because the platen must go through heating and cooling cycles, the rate at which these cyles may be performed is important from a production standpoint. For this reason, it may be advantageous to use platens constructed of monolithic graphite. Such platens are described in copending U.S. patent application Ser. No. 07/513,634 filed Apr. 24, 1990, now abandoned, entitled "Monolithic Graphite Press Platens and Their Use in Consolidating Fiber Reinforced Structural Materials", which is herein incorporated by reference. To protect the soft graphite surface, the graphite platen may be coated with a thin metal coating, as described in copending U.S. application Ser. No. 07/488,932 now abandoned, which is also herein incorporated by reference. The graphite platens have the double advantage of higher heat transfer rates, often double that of steel platens, and further that the temperature uniformity across the platen surface is greater.

Heated tertiary formers may also be utilized, but this method presents problems with uniformly applying pressure, although a platen above the rods may be utilized to avoid this drawback. An alternative method of fusing is to supply heat to the node-antinode surface by suitable means, for example by focused infrared radiation, ultrasonic energy, laser energy or hot air, and to use one of the previously described devices, i.e., a shoe, platen, rod, or other equivalent means merely to supply pressure. These devices may also require some heating to offset the heat transfer which will of necessity take place during the pressurized fusion. However, in this case, the heating and cooling cycles and degree of heating will be substantially less as a substantial portion of heat is applied to the node-antinode surface itself rather than being supplied solely by the shoe, platen or rod. By far the most rapid processing is obtained when only the fiber-reinforced or unreinforced web itself, with its low thermal mass, is heated.

An alternative process for the preparation of thermoplastic honeycomb is illustrated by the apparatus in FIGS. 4, and 9-11. This method is similar to that heretofore described, however the fusion means is improved and the corrugation step may be incorporated into the process. In this preferred method, the lowermost formers (1) are inserted through the topmost honeycomb cells into the bed frame as before, the topmost rods (4) inserted, and a corrugated fiber-reinforced thermoplastic sheet positioned atop the topmost rods. The corrugated sheet or web may be precorrugated or may be corrugated as it is layed down. The node-antinode mating surfaces are then selectively heated, by dielectric heating, focused infrared radiation, hot gas or other equivalent means, and the pressure required for fusion supplied by a toothed cylinder moving transverse to the direction of the corrugations (along the honeycomb length). This combination can also be used parallel to the cell direction if the web is already in place and held there by means of tertiary formers. In some instances, it may be desirable to shield the non-contact areas of the top thermoplastic sheet from the heat source by a suitable baffle with longitudinally extending slits whose spatial frequency corresponds to the node-antinode frequency and location. This method, sans baffle, is illustrated by FIG. 4. In FIG. 4, toothed cylinder or wheel (31) supplies pressure to the node-antinode contact area (32) as it rolls across the honeycomb top surface. The toothed wheel preferably has a width equal to the honeycomb thickness, or a substantial fraction thereof, i.e. greater than one third the thickness dimension, preferably greater than one half the thickness dimension. Heating means (33), here a jet of hot gas, precedes the path of the cylinder. The teeth of the cylinder advantageously have a convex surface such that pressure is smoothly applied with the rolling motion. Uncorrugated web material (34) is supplied through guide (35). Corrugation and consolidation are thereby integrated into the manufacturing process. The topmost (4) and lowermost (1) formers are withdrawn and reinserted as previously described with reference to FIGS. 1 and 2A-2C.

Figure 8A:
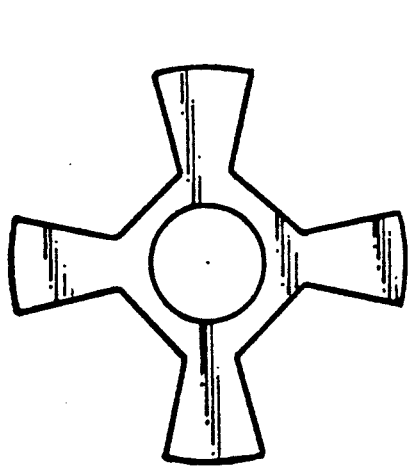
FIGS. 8A-8B—Alternative geometries of 4 and 5 toothed corrugation and/or consolidation rollers.
Figure 8B:
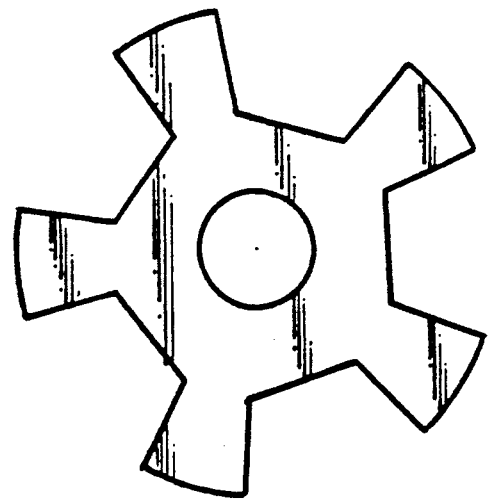

Instead of a toothed cylinder, a squirrel cage cylinder having bars of the appropriate geometry may be used. However this method suffers from the dual drawbacks that the rods may distort, particularly for honeycomb of fine cell width, and that the bars do not have the same thermal mass of the cylinder. The cylinder or cage is not heated, but rather is desired to be maintained at a sufficiently low temperature such that resin transfer is avoided. By the toothed roller method, honeycomb consolidation may take place at a speed of 15 lineal inches/sec. (38 cm/sec) or higher. Alternative gemoetries of 4 and 5 toothed rollers are shown in FIGS. 8A and 8B. An elongated plunger having the appropriate geometry and other equivalent means may be utilized as well.

In this most preferred embodiment, the thermoplastic web is corrugated and fused in one integrated step. By this method, the problems associated with handling precorrugated webs are avoided. This is important, as it is sometimes difficult to prepare corrugated material to exact dimensions. Furthermore, it is often difficult to feed such material onto the top honeycomb surface without stretching or distorting the web and thus the node to antinode spatial relationship. In this preferred method, the thermoplastic web is supplied from a roll in an uncorrugated state. The web is laid down atop the topmost layer of honeycomb and both the honeycomb and web simultaneously heated. The web is simultaneously corrugated and fused by the trailing toothed wheel as previously described.

Figure 11A:
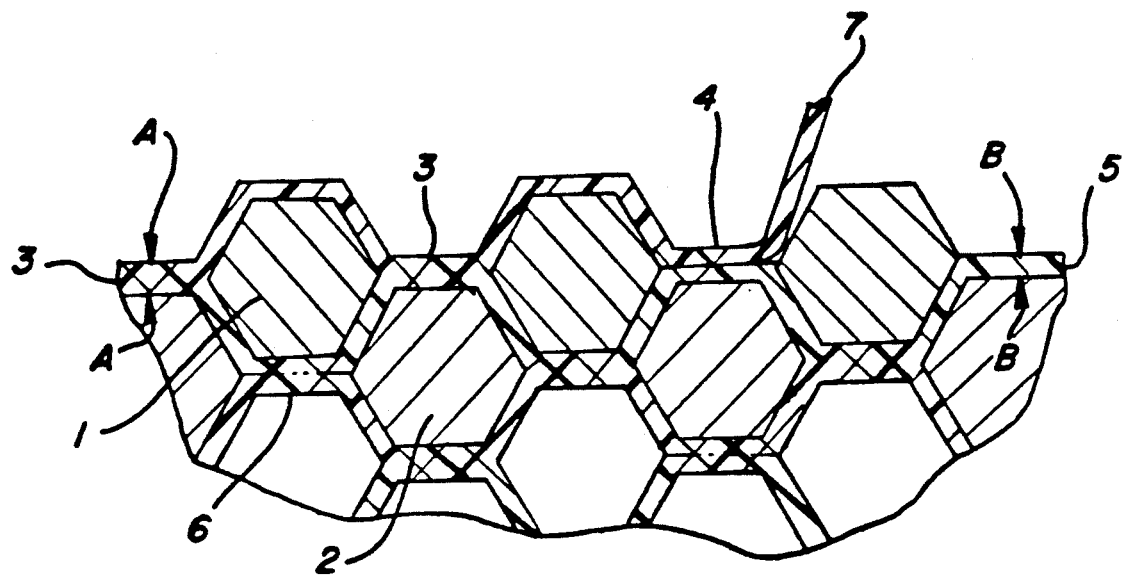
FIGS. 11A-11B—Illustrates more closely the web to web relationship in the top honeycomb layer and the difference between unconsolidated and consolidated web thicknesses.
Figure 11B:
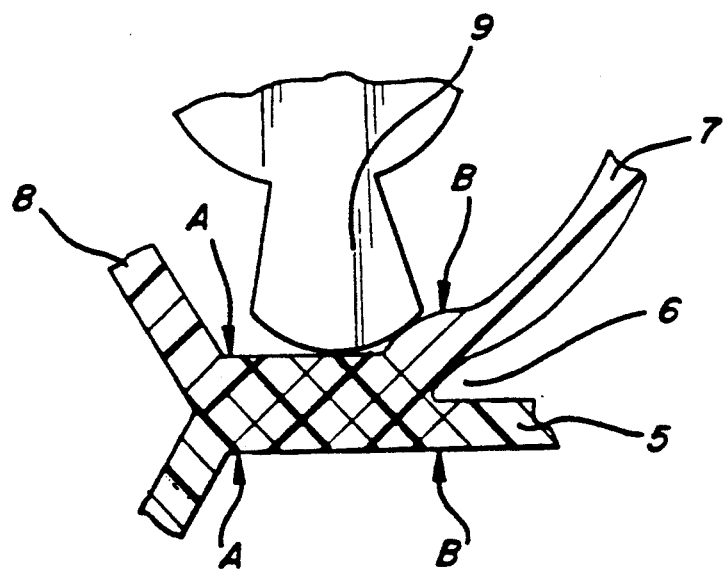

FIGS. 11A and 11B illustrate in an enlarged fashion, the consolidation process, in this case utilizing a toothed roller, the preferred method, with hot gas, microwave, or radiant heating (heating means not shown). In FIG. 11A, the upper web (6) of fiber reinforced web lies atop the topmost set of rods of which (4) is the leftmost member in the drawing. The bottom web (8) lies atop the lowermost set of rods of which (1) is the leftmost member completely shown, and between the topmost and lowermost rods. The uncorrugated, one web thickness is shown at B—B. At (9) in FIG. 11A is shown the consolidated web which across section A—A is generally about 80 percent of double the B—B thickness. During corrugation/consolidation, the webs are heated, and corrugation/consolidation roller (29) in FIG. 11B) lays down and consolidates the webs at (10 in FIG. 11A). FIG. 11B illustrates the degree of compaction which may vary from virtually 100% with all thermoplastic webs to 70 percent, 50 percent or less of the original two ply thickness with fiber-reinforced materials. The higher the degree of thermoplastic impregnation, the greater the anticipated degree of compaction.

Again, with reference to FIG. 11B, section B—B in the unconsolidated two ply thickness while the consolidated thickness at A—A is approximately 80 percent of the B—B B thickness. At (28) is shown the side wall of the honeycomb which may be substantially the same thickness as the unconsolidated web, or which may, especially in the case of the high thermoplastic content webs, be somewhat less than that thickness. The geometry of the roller may be adjusted to supply high, little, or no pressure on these side wall surfaces.

Again with reference to FIG. 11A, the fully consolidated node-antinode deme is shown at (9) and the uncorrugated web (7) is simultaneously corrugated and consolidated by the roller (not shown) by heating with heating means (not shown) and being compressed between the roller and the topmost set of bars (formers).

Figure 9:
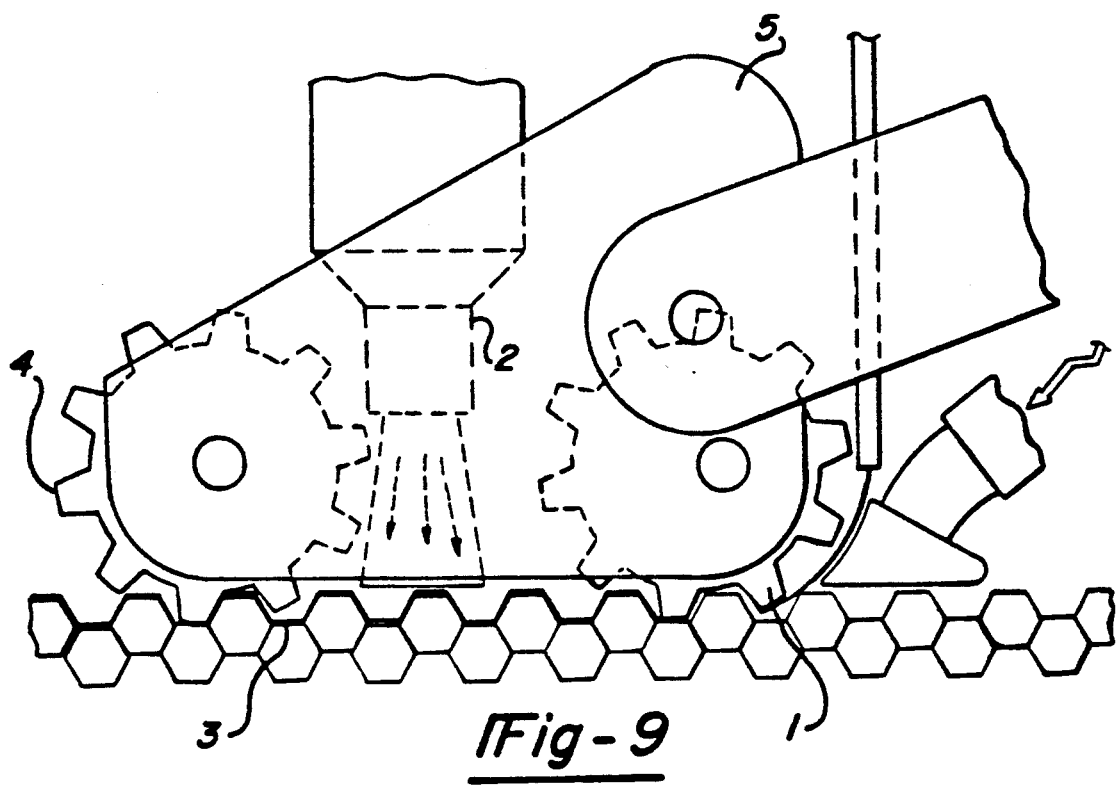
FIG. 9—Double toothed-roller embodiment showing second roller further consolidating the web.

FIG. 9 illustrates a secondary bonding consolidation embodiment. Trailing the path of consolidation/corrugating wheel (41) is an optional secondary fusion heat source (24) which heats the already fused node to antinode surfaces (36) for a second fusion/consolidation in order to achieve more complete bonding. Pressure for bonding is supplied by second roller (42); while heat is supplied by secondary air jet (24). The rollers are mounted in carriage (45) which, upon reaching the end of the bed of formers, is raised and traversed back to the start position after severing the end of the web. The secondary bonding technique may also be used with the continuous dual corrugating/consolidating roller system portrayed in FIGS. 10A-10C. In this case, two pairs of secondary bonding wheels and secondary jets are utilized, one on the leading and one on the trailing side of the rotatable central corrugation/consolidation wheels.

Figure 10A:
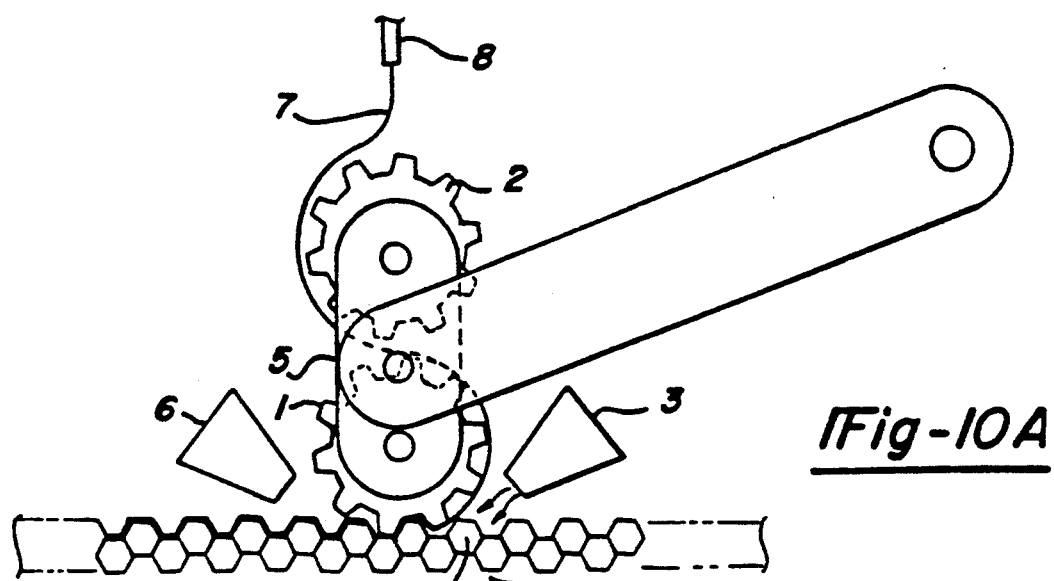
FIG. 10A—Two roller embodiment allowing bidirectional corrugation/consolidation with wrapover at end of the bed.
Figure 10B:
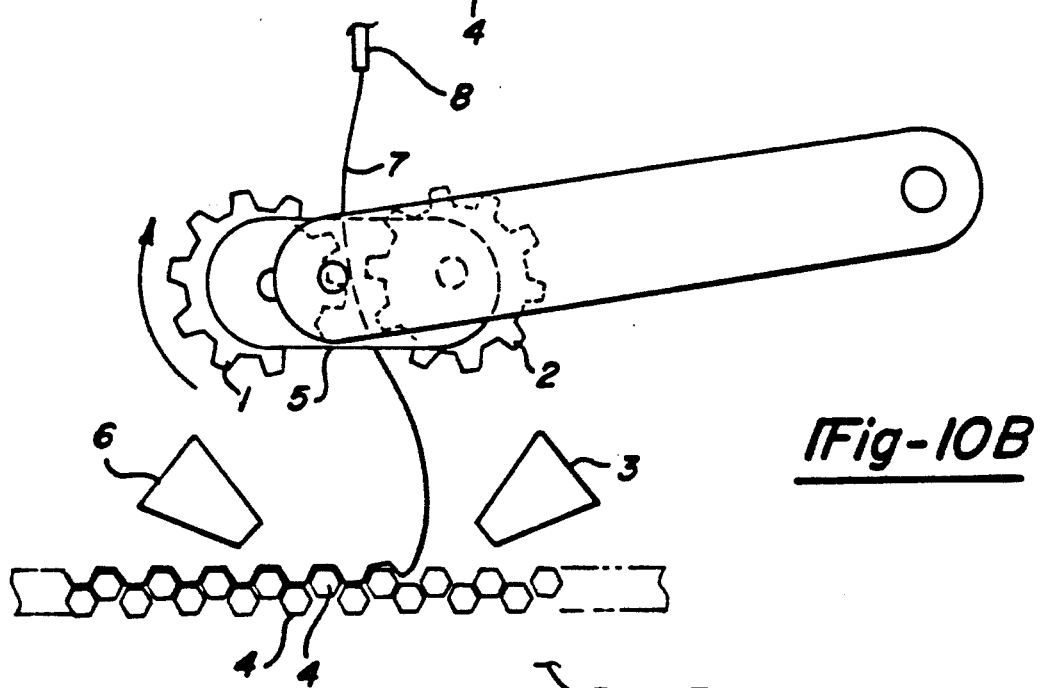
FIG. 10B—The two roller method of FIG. 11 showing roller assembly rotation.
Figure 10C:
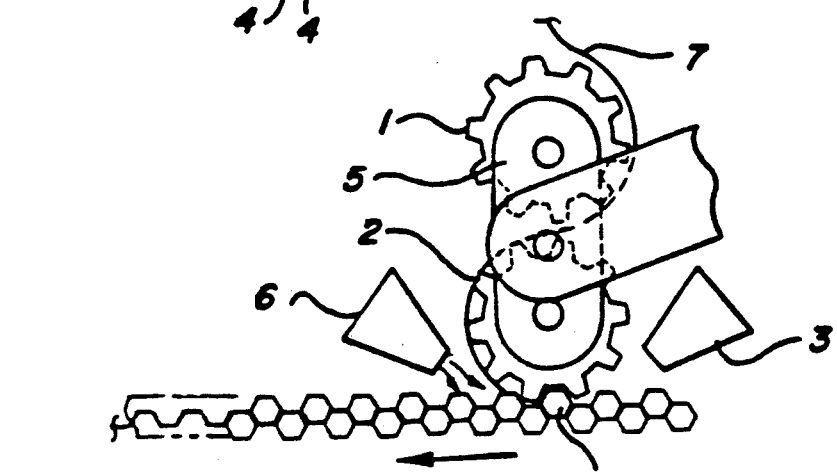
FIG. 10C—The two roller method of FIG. 11 at the beginning of reverse travel.

FIGS. 10A-10C illustrate a method of forming honeycomb which eliminates traversing the toothed roller and selective heating means back to its initial starting position prior to laying down the next. In this embodiment, two hot air heating means are used. The thermoplastic web is laid down as the twin consolidation and corrugating rollers (41) and (42) pass left to right. The bottom most roller (41) performs corrugation and consolidation. Uncorrugated web (34) is supplied through guide (35). Hot air for corrugating and fusing the web is produced by hot air jet (33) similar to that shown in FIGS. 7 and 12. When the advancing web reaches last former (4) at the edge of the bed, the gas flow to heating means (33) is shut off, the bottom-most row of formers is retracted, raised by an amount slightly greater than the height of the consolidated node-antinode thickness, reinserted becoming now the topmost row of formers, and lowered down onto the honeycomb, preferably exerting pressure between the honeycomb topmost layer and the lower set of formers. The carriage (45) containing the twin corrugating/consolidating rollers then rotates clockwise as depicted in FIG. 10B as the rods are exchanged thus wrapping the web around the end topmost former (4 in FIG. 10C). The rollers then traverse right to left with the left most air heating means (26) turned on to heat the web to the consolidation temperature. At the end of its travel, the left most hot air jet (26), is turned off, the bottom-most formers retracted, raised, inserted and clamped as before, and the consolidation wheel carriage rotated counter-clockwise to the original position. This process is repeated until the desired honeycomb width is achieved.

FIG. 10B shows the apparatus of FIG. 10A in partial clockwise rotation, in this case partway down the bed rather at the end. It is possible to make any particular former the "last" former. FIG. 10C shows the apparatus traversing right to left with hot air jet (26) supplying heat while jet (33) is shut off. The uncorrugated web (34) is supplied through guide (35) mediate to the two rollers (41) and (43).

Figure 12:
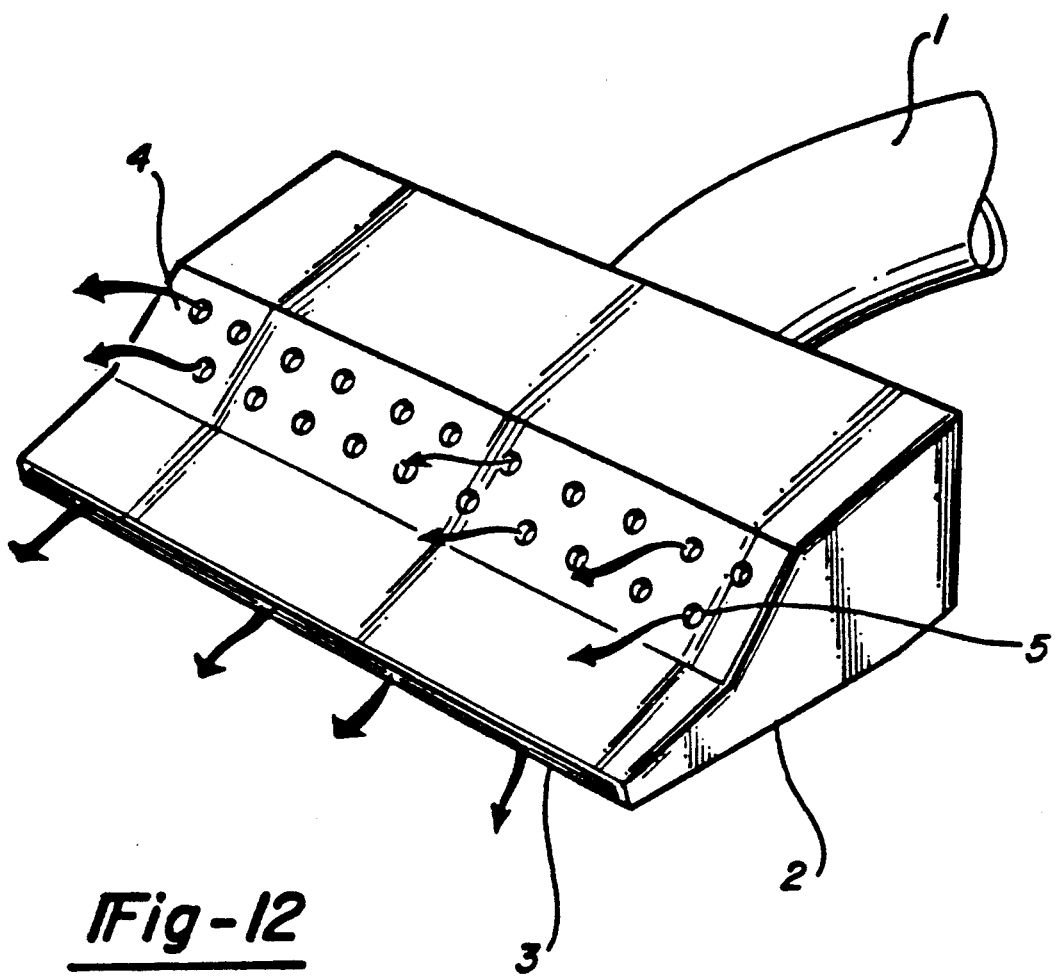
FIG. 12—Another configuration of hot gas heating means.

FIG. 12 depicts a configuration of gas impingement jet (27) which has been found to eliminate the lack of total consolidation of the node-antinode demes when used with a four or five toothed consolidation roller. With reference to FIG. 12, the major hot gas delivery through tube (30) exits the jet through slit (37). Bleed holes (55) result in hot gas jets 44 which impinge upon the lower surface of the uncorrugated web being applied. The extended nozzle contains an internal baffle separating the major gas stream from the bleed stream. By use of the extended nozzle, the shadow area in the antinode depression is eliminated, resulting in complete consolidation.

The examples below have been run with numerous fiber reinforcements, for example glass fiber webs of 108, 112, 120, and 7781 woven styles and 1 to 3 oz. non-woven webs; carbon fiber webs of collimated unidirectional tape, 282 woven style, and 0.5 to 4 oz nonwovens; and Nomex ® fibers in a Kendall style 1209 non-woven web. Tyvek ® style 1085A spunbonded 100% polyethylene web, Typar ® style 3353 100% polypropylene web, and Reemay ® style T-550 100% polyester web have also been used. Resins used were polyethersulfone, polyphenylene sulfide, polyetherimide, polyetheretherketone, polyetherketoneketone, ULTRASON ® 2000 liquid crystal polymer, polyethylene, polypropylene, polyethylene terephthalate, and nylon.

EXAMPLE 1

A variety of thermoplastic fiber reinforced honeycombs were prepared with $\frac{1}{8}$" and $\frac{1}{4}$" cell sizes by utilizing the device shown in FIG. 1 without the toothed wheel consolidation roller but with rolling and sliding hot shoes. The rolling hot shoe had a 7 inch radiused surface temperature of 700–900 F. (371–482 C.). Presheated to 1000 F. (538 C.) which resulted in a contact surface temperature of 700–900 F. (371–482 C.). Pressure on the node-antinode surface varied between 80–140 psi. Bonding speed in the direction transverse to the corrugations (along the corrugations length) was 2–6 inches (5–15 cm/sec.).

The honeycomb materials produced were prepared by laying up precorrugated strips of thermoplastic fiber-reinforced and non-reinforced webs onto the topmost set of formers, and pressing the hot shoe or sliding platen atop the node-antinode demes at a rate sufficient to fuse the node-antinode demes.

The sliding platens utilized varied from 1" (2.5 cm) to 6" (15 cm) in the node direction. Single node-width sliding hot-shoes (sliding platens) as well as those corresponding to the width of the entire honeycomb were utilized. Transverse speed was varied as with the rolling platen described before. Platen materials utilized included stainless steel, aluminum, and monolithic graphite. Heating was by strip heaters (1000–3000 watt Watlow) which were in constant contact with the platen surface. The single node sliding platen utilized a $\frac{1}{8}$" diameter cartridge heater wrapped with 2 mil stainless steel foil, this heating device comprising the bottom-most surface of the platen. Heater temperatures varied from 800–1200 F. (427–649 C.) resulting in temperatures at the web surface of from 650–850 F. (343–454 C.). Typical pressures at the web surface were between 80 and 160 psi.

EXAMPLE 2

The procedures of example 1 were followed, but a fixed platen as in FIG. 6 (no rolling or sliding motion) was utilized. Graphite and ceramic platens were the platen materials of choice since the platens must cool down before removing from the fused node-antinode demes. Rapid thermal cycling dictated a platen with low thermal mass. Strip heaters contacting the top of the platen surface proved slow to heat up (7–10 min/cycle). Typical heater temperatures were in the range of 1200–1500 F. (649–816 C.). The preferred heating source was an HTT Moen System of hot air impingement onto the top of the platen. The orifice size of the air jets were in the range of 0.020" (0.05 cm) to 0.100" (0.25 cm) with the ratio of the distance to platen surface/orifice size lying between 2 and 8. Compressed air at 1200–1600 F. (649–871 C.) was fed at a back pressure of 10–20 psig. By use of this method, cycle time of 1–4 minutes were observed with thermoplastic matrices having Tg's in the 400 F. (204 C.) range and melt temperatures between 650 and 800 F. (343 C to 427 C) such as PEEK polyetherketone or PES polyethersulfone.

EXAMPLE 3

In honeycombs prepared by this example, a precorrugated sheet was layed up as in example 1 and hot air or infrared heat used to heat the thermoplastic web. Consolidation was performed by a rolling, sliding, or fixed platen as in Examples 1 and 2. A disadvantage of this method is that a clamping mechanism must be used as without it the corrugated web distorts upon heating, and the node-antinode demes are dislocated.

EXAMPLE 4

The former bed of FIG. 1 is utilized, with a ten tooth corrugation/consolidation roller as depicted in FIG. 4. The pitch and geometry of the roller teeth is based upon the desired honeycomb geometry (former shape) taking into account the thickness of the web. Conventional design techniques were used to determine the geometry appropriate for each trial. The toothed wheel geometry used in this example is as depicted in FIG. 4.

Figure 7:
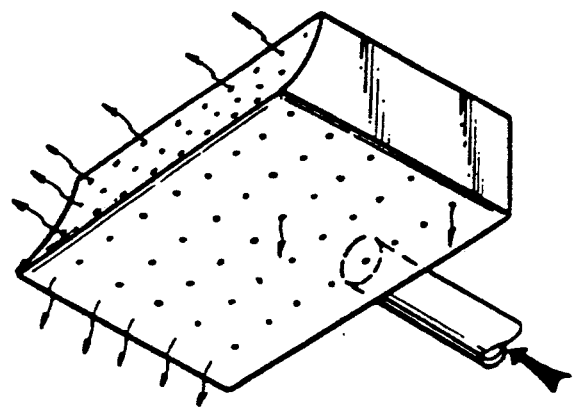
FIG. 7—Isometric view of one configuration of hot gas impingement heating means.

A hot air jet with geometry shown in FIG. 7 was used to supply hot air to the uncorrugated thermoplastic web just prior to its corrugation/consolidation as shown in FIG. 4 at 2. An ADC hot gas torch running nitrogen at a back pressure of between 50 and 100 psig and a flow rate of between 50 and 100 SCFM produced an exit gas temperature typically of from 1100-1400 F. (593-760 C.), and 800-900 F. (427-482 C.) at the web surfaces. An HTT Moen unit using compressed air was also used. The nozzle type and size is dependent upon material composition and width, but typical nozzles had a distance to web/orifice size ratio between 2 and 8.

The uncorrugated material was fed onto the honeycomb top surface with the hot air jets on and the roller running at speeds of from 1 to 20 inches/sec (2.5 to 51 cm/sec) typically from 6 to 12 inches/sec (15 to 30 cm/sec) at a pressure on the node-antinode deme of between 50 to 300 psi, typically between 80 and 160 psi. Examples of measured consolidation speeds which have been achieved are 10 inches/sec (25.4 cm/sec) with 7781 woven glass fiber/polyphenylene sulfide; 6 inches/sec (15.2 cm/sec) with 112 woven glass/polyethersulfone; and the Tyvek ®, Typar and Reemay nonwovens at 15 ips (38.1 cm/sec). The width of the roller used in this example was 11.5 inches (29.2 cm).

When the roller and web reached the end of the row of formers, the gas flow was interrupted, the web cut with a razor knife, and the roller and uncorrugated web traversed to the starting position. At this position, the lowermost rods were withdrawn, raised by a distance greater then the thickness of the consolidated node-antinode surface, reinserted, and clamped down. The process of corrugation/consolidation was then repeated until the desired honeycomb width was reached.

This process resulted in more uniform webs having more perfect cell shape. With some web materials, incomplete bonding of the node/antinode deme at the area furthest from the advancing toothed roller was noted. A change in nozzle design has alleviated this problem, for example by using the four toothed and five toothed consolidation rollers of FIGS. 8A and 8B with the modified gas impingement heater of FIG. 12. A second fusion step as depicted in FIG. 9 would also result in superior consolidation.

A 3.3 lb/ft$^3$, $\frac{1}{4}$" cell honeycomb made according to this example from 108 style woven glass oriented on a ±45° bias to the cell direction and impregnated with 35 percent by weight polyethersulfone was manufactured and tested yielding the following results:

| | |
|---|---|
| Flatwise Compression | 158 psi |
| Flexure | 350 lbs |
| Plate shear | 988 lbs |

These values compare favorably to values for thermoset honeycomb. However the thermoplastic honeycomb requires only 1 minute to fabricate a cubic foot of honeycomb structure exclusive of top and bottom panels, while a similar thermoset honeycomb or adhesively bonded thermoplastic honeycomb requires typically greater than 24 hours to fabricate a similar size structure.

EXAMPLES 5-7

Induction bonding, ultrasonic bonding, as well as resistance heating of the fibers and ultrasonics were attempted. All of these attempts were successful in bonding the materials together but it was difficult to achieve adequate process speed and accuracy of heating.

Induction bonding experiments were conducted using the RF source from a home microwave oven (believed to be operating at 2.5 GHz and having up to 700 watts output) and a rectangular waveguide component with one end connected to the RF source and the other end potted with an RF transparent epoxy as the pressure surface/energy window. The level of power was varied as a function of resin type, web thickness, and fiber type. Only lower melting resins were used such as polyethylene and nylon because of the temperature limitations of the epoxy window. Since the resins by themselves had little or no loss term associated with them, it was generally required to add a small amount of loss medium, such as carbon black or iron carbonyl powder, to the resin to enhance the susceptability of the materials to the RF radiation. Glass reinforced systems were able to be bonded in less than two seconds/bond, however, the presence of carbon fibers in the resin usually precluded sufficient heating due to the high reflectivity of the fibers to the radiation.

Ultrasonics experiments in this area of technology utilized a 1000 watt Sonics and Materials industrial ultrasonic welding unit. These units work on the principle of converting an oscillating electrical signal into a mechanical one via a crystal convertor. The mechanical vibrations are then passed through a tuned horn of the appropriate shape. The fusion of the thermoplastic material occurs when the vibrating horn causes the two web surfaces to vibrate against one another and subsequently causes a frictional heat build up that is sufficient to melt the two materials together. Several horns were constructed (a 0.150" diameter face horn and a 4"×0.144" face horn) and used in the tests with amplifiers ranging from 1:1 to 1:2.5. Testing revealed that sufficient bond strength could be achieved in less than two seconds per node. Tests were performed on glass/PES, PPS, and PEEK equivalents in both woven and non-woven styles. The non-reinforced resin webs bonded, on average, twice as fast as the reinforced versions. The glass reinforced systems were perhaps 25-50 percent faster than the graphite systems. The horn surface had to be in the absolutely correct position (parallel to the rod surface from one end to the other) in order to achieve uniform bonding over the entire node bond area. If this is not done, poor, irregular bonding will result. Because of the shape of the horn, this is not easily accomplished, and requires a self-aligning mounting device which will compensate for the inevitable web and rod irregularities. This difficulty then presents a potential difficulty for a multiple faced horn design because it will be difficult to guarantee a uniform web thickness or rod surface over a multiple node area. This is essentially the same problem faced by the solid platen approach described earlier which requires individual platen pressure elements to overcome. However, this fix will not work as well with ultrasonics since the horn must have intimate contact with the both the booster mating surface as well as the material for optimal energy transfer to occur. Therefore, the only approach that appears to be feasible is to use a series of single faced horns which are each driven by their own convertors. However, like the multiple platen approach, it does require a rather high level of mechanical complexity to put into effect.

Resistance heating of the fibers themselves (carbon or graphite in this case), was attempted. An AC/DC welder was used to apply various amounts of both AC and DC currents through the carbon fibers in order to heat the surrounding fibers. Heat up times were quite rapid but it was difficult to maintain a constant level of contact with the carbon fibers as the heating took place so that the degree of heating was difficult to control. Cycle times were less than two seconds per node but the amount of heating from node to node was quite erratic. An extension of this technique was also applied to a heating of the rod mandrels. Since the original steel rods would be difficult to heat up and cool down quickly without losing their dimensional stability, these metal rods were replaced with monolithic carbon rods supplied from Stackpole, Inc. A high current/low voltage energy source was connected to the rods as the top (already corrugated) web was applied in a rolling fashion. Because the rods had to heat to a sufficient temperature and then transfer that heat to both layers of material, the process is inherently slow but it does work. A strip of copper conductor was used to apply the current to the rods in a sequential fashion as the top layer of web is applied. Bond times of approximately 10 seconds/node were achieved using this method. An alternative method of heating the rods was to insert small ($\frac{1}{8}$" diameter) cartridge heaters inside the carbon rods for the heat source. The draw back to this technique was the slow cycle time of the cartridge heat source. Bond times for this method average over 20 seconds/bond.

I claim:

1. Apparatus for continuously forming thermoplastic honeycomb core from a continuous web of uncorrugated thermoplastic web material, comprising:
   (a) a lowermost set of metal formers for supporting said honeycomb core, said metal formers of said first set being disposed during use of said apparatus within the topmost cells of said honeycomb core;
   (b) a topmost set of metal formers displaced by half the cell spatial frequency of said honeycomb core for forming a half-cell configuration of said honeycomb core;
   (c) web supply means for supplying said continuous web of uncorrugated thermoplastic web material over the topmost set of formers;
   (d) heating means positioned to selectively heat the underside of the web being supplied from said web supply means and the previously formed half-cell at the node-antinode mating surfaces in the vicinity of each respective consecutive metal former of said first set of metal formers to a temperature above the softening temperature of the web;
   (e) pressure applying means for applying forming pressure to the just heated web to form therein a half-cell configuration while substantially simultaneously fusing consecutively the just formed antinode of the half-cell configuration to the corresponding node of the topmost cells of the honeycomb core; and
   (f) means for retracting the first set of formers raising said formers by an amount at least equal to the thickness of the fused node-antinode surface, and redisposing the first set of formers in the antinode depressions in the last formed half-cell configuration, said redisposed formers thereby becoming topmost formers; said apparatus enabling continuous formation of honeycomb core wherein consecutive layers of uncorrugated thermoplastic web may be substantially simultaneously and continuously laid-down, corrugated and fused.

2. The apparatus of claim 1 wherein said heating means comprises a hot air blower.

3. The apparatus of claim 1 wherein said pressure applying means comprises a first roller having a width equal to the thickness of the honeycomb core to be formed, and a plurality of projections disposed radially from its surface along its length, said projections being adapted to contact the topmost surface of each consecutive node-antinode surface of the honeycomb core.

4. The apparatus of claim 3 which further comprises (g) means for reversing the direction of travel of said web when said web reaches the end of the topmost set of metal formers.

5. The apparatus of claim 4 wherein the means for reversing the direction of travel of said web comprises a second roller having a width equal to the thickness of the honeycomb core and a plurality of projections disposed radially from its surface along its length, said projections being adapted to contact the topmost surface of each consecutive node-antinode surface of the honeycomb core, and means for driving said second roller in the direction opposite to the direction of travel completed by said first roller after said redisposed formers become topmost formers.

6. Apparatus for continuous production of honeycomb core from continuous web of thermoplastic material comprising:
   a first set of spaced apart and parallel metal former rods;
   a second set of spaced apart and parallel metal former rods, the metal former rods in said first set being opposed to and offset from the metal former rods in said second set by half the cell spatial frequency of the honeycomb core;
   first movable holding means adapted to hold each of the rods of said first set of metal formers at the rearwardmost end thereof;
   second movable holding means adapted to hold each of the rods of said second set of metal formers at the rearwardmost end thereof most remote from said first movable holding means;
   each of said first and second sets of metal former rods being held by said first and second holding means, respectively, in horizontal planes such that said first set of rods is offset from the second set of rods by half the cell spatial frequency of the honeycomb core;
   first moving means for moving said first holding means towards and away from said second holding means;
   second moving means for moving said second holding means towards and away from said first holding means;
   first lifting means for raising and lowering said first holding means;
   second lifting means for raising and lowering said second holding means;
   a toothed roller disposed above said first and second sets of metal former rods and adapted to roll over and across said first and second sets of metal formers with the teeth of said toothed roller fitting between adjacent rods of the topmost one of said first and second set of metal former rods;
   guide means for guiding a continuous web of thermoplastic material to between said topmost one of said sets of metal former rods and the toothed roller;
   means for rolling said toothed roller over said thermoplastic web and onto and across said sets of metal former rods to thereby form corrugations in said thermoplastic web;
   heating means disposed between the web of thermoplastic material and the metal former rods for selectively heating the underside of the thermoplastic web material at the area of contact of the web at the node-antinode mating surface with the previously formed half-cell;

means for withdrawing the lowermost one of said sets of metal former rods from the formed honeycomb core, for raising the withdrawn set of metal formers rods to above the topmost set of former rods, and lowering the raised set of former rods to the node depression in the just formed corrugated web of thermoplastic material, thereby becoming the topmost set of former rods; and means for reversing the direction of travel of said toothed roller and said thermoplastic web when said toothed roller reaches the end of said metal formers and after the placement of the lowermost set of former rods as the topmost set of former rods;

whereby, successive layers of the continuous web material can be continuously and substantially simultaneously laid down, corrugated and fusion bonded at the node-antinode contacting surfaces.

7. The apparatus of claim 1 wherein the heating means (d) comprises infrared radiation, microwave radiation of dielectric heating means.

* * * * *